(12) United States Patent
Zhao et al.

(10) Patent No.: US 12,302,349 B2
(45) Date of Patent: May 13, 2025

(54) CONFIGURATION METHOD FOR SIDELINK CONFIGURED GRANT, DEVICE AND STORAGE MEDIUM

(71) Applicant: GUANGDONG OPPO MOBILE TELECOMMUNICATIONS CORP., LTD., Guangdong (CN)

(72) Inventors: Zhenshan Zhao, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 341 days.

(21) Appl. No.: 17/871,774

(22) Filed: Jul. 22, 2022

(65) Prior Publication Data

US 2022/0369360 A1 Nov. 17, 2022

Related U.S. Application Data

(63) Continuation of application No. PCT/CN2020/090334, filed on May 14, 2020.

(30) Foreign Application Priority Data

Feb. 6, 2020 (WO) ............... PCT/CN2020/074441
Apr. 1, 2020 (WO) ............... PCT/CN2020/082818
Apr. 2, 2020 (WO) ............... PCT/CN2020/083031

(51) Int. Cl.
*H04W 72/23* (2023.01)
*H04L 1/1607* (2023.01)
(Continued)

(52) U.S. Cl.
CPC ........... *H04W 72/23* (2023.01); *H04L 1/1642* (2013.01); *H04W 72/02* (2013.01); *H04W 72/0446* (2013.01)

(58) Field of Classification Search
None
See application file for complete search history.

(56) References Cited

U.S. PATENT DOCUMENTS

2018/0152924 A1* 5/2018 Ouchi ................ H04W 48/10
2019/0342910 A1 11/2019 Cao et al.
(Continued)

FOREIGN PATENT DOCUMENTS

CN 106162900 A 11/2016
CN 107211430 A 9/2017
(Continued)

OTHER PUBLICATIONS

The second Office Action of corresponding Chinese application No. 202211001640.5, dated Oct. 16, 2023.
(Continued)

*Primary Examiner* — Robert M Morlan
(74) *Attorney, Agent, or Firm* — Ladas & Parry, LLP

(57) ABSTRACT

Embodiments of the present application provide a configuration method for a sidelink configured grant, a device and a storage medium. The method includes: sending, by a network device, a parameter for determining sidelink configured grant (CG) transmission resources, where the CG transmission resources have same time domain positions in different frame periods. Since the CG transmission resources determined using the parameter configured via a network have the same time domain positions in different frame periods, a terminal device may accurately determine the time domain position of the CG transmission resource no matter in which frame period the terminal device has received the parameter sent by the network device.

13 Claims, 6 Drawing Sheets

(51) Int. Cl.
H04W 72/02 (2009.01)
H04W 72/0446 (2023.01)

(56) References Cited

U.S. PATENT DOCUMENTS

| 2019/0342911 | A1 | 11/2019 | Talarico et al. | |
| 2020/0220669 | A1* | 7/2020 | Park | H04L 1/1896 |
| 2022/0022094 | A1* | 1/2022 | Lee | H04L 1/1822 |

FOREIGN PATENT DOCUMENTS

| CN | 109219024 A | 1/2019 |
| CN | 109413722 A | 3/2019 |
| CN | 109565853 A | 4/2019 |
| CN | 109803397 A | 5/2019 |
| CN | 110035529 A | 7/2019 |
| CN | 110431894 A | 11/2019 |
| WO | 2017075798 A1 | 5/2017 |
| WO | 2019024120 A1 | 2/2019 |
| WO | 2019031808 A1 | 2/2019 |
| WO | 2019137342 A1 | 7/2019 |
| WO | 2019210811 A1 | 11/2019 |
| WO | 2020007086 A1 | 1/2020 |
| WO | 2021155636 A1 | 8/2021 |
| WO | 2021155646 A1 | 8/2021 |

OTHER PUBLICATIONS

Ericsson, "Support of Configured SL Grant in Mode 1", R2-1907352, 3GPP TSG-RAN WG2 #106, Reno, USA, May 13-May 17, 2019.
Intel Corporation, "NR V2X sidelink communication in resource allocation mode-1", R1-1912204, 3GPP TSG RAN WG1 Meeting #99, Reno, Nevada, USA, Nov. 18-22, 2019.
Oppo, "Mode 1 resource allocation for NR SL", R1-1910373, 3GPP TSG RAN WG1 #98bis, Chongqing, China, Oct. 14-20, 2019.
Spreadtrum Communications, "Discussion on NR sidelink mode 1 resource allocation", R1-1906363, 3GPP TSG RAN WG1 #97, Reno, USA, May 13-17, 2019.
Apple, "On Mode 1 Resource Allocation", R1-1912811, 3GPP TSG RAN WG1 #99, Reno, USA, Nov. 18-22, 2019.
LG Electronics, "Discussion on NR sidelink resource allocation for Mode 1", R1-1912587, 3GPP TSG RAN WG1 #99 Meeting, Reno, US, Nov. 18-22, 2019.
The Extended Europe Search Report for the corresponding European application No. 20917748.4, dated May 31, 2023.
The first Office Action and search report for the corresponding Chinese application No. 202211001640.5, dated Aug. 2, 2023.
International Search Report (ISR) dated Nov. 10, 2020 for Application No. PCT/CN2020/090334.
Written Opinion (WOSA) dated Nov. 10, 2020 for Application No. PCT/CN2020/090334 with English translation provided by Google Translate.
International Search Report (ISR) dated Oct. 26, 2020 for Application No. PCT/CN2020/083031.
Written Opinion (WOSA) dated Oct. 26, 2020 for Application No. PCT/CN2020/083031 with English translation provided by Google Translate.
International Search Report (ISR) dated Oct. 28, 2020 for Application No. PCT/CN2020/074441.
Written Opinion (WOSA) dated Oct. 28, 2020 for Application No. PCT/CN2020/074441 with English translation provided by Google Translate.
NEC:'Mode 1 resource allocation mechanism for NR sidelink' 3GPP TSG RAN WG1 #98bis R1-1911027 Oct. 8, 2019.
LG Electronics Inc.:'[Running CR] Introduction of 5G V2X with NR Sidelink' 3GPP TSG-RAN WG2 Meeting #108 R2-1916120 Nov. 15, 2019.
3GPP. "3rd Generation Partnership Project; Technical Specification Group Radio Access Network; NR; Medium Access Control (MAC) protocol specification(Release 15)" 3GPP TS 38.321 V15.8.0, Dec. 31, 2019 (Dec. 31, 2019), entire document.
Vivo:'Remaining issues on mode 1 resource allocation mechanism' 3GPP TSG RAN WG1 #100 R1-2000316 Feb. 4, 2020.
OPPO: "Remaining issues of mode 1 resource allocation for NR-V2X," 3GPP TSG RAN WG1 #100, R1-2000490 Mar. 6, 2020, all pages.
CATT: "Discussion on enhanced UL configured grant transmission," 3GPP TSG RAN WG1 Meeting #97, R1-1906332 May 17, 2019, all pages.
The Notice Of allowance of corresponding Chinese application No. 202211001640.5, issued by the Chinese Patent Office. on Jan. 5, 2024, and its English Translation provided by foreign associate.
Lenovo, Motorola Mobility, Discussion on resource allocation for NR sidelink Mode 1, R1-1910145, 3GPP TSG RAN WG1 #98bis, Chongqing, China, Oct. 14-20, 2019.
ZTE, Initial consideration on NR V2X resource allocation, R2-1814168, 3GPP TSG-RAN WG2#103bis, Chengdu, China, Oct. 8-12, 2018.
ZTE, Sanechips, Consideration on NR V2X configured grant resource allocation, R2-1906480, 3GPP TSG RAN WG2 Meeting #106, Reno, USA, May 13-17, 2019.
Huawei, HiSilicon, Discussion on Sidelink Configured Grant support, R2-1913702, 3GPP TSG-RAN WG2#107bis, Chongqing, China, Oct. 14-Oct. 18, 2019.

* cited by examiner

CONFIGURATION METHOD FOR SIDELINK CONFIGURED GRANT, DEVICE AND STORAGE MEDIUM

CROSS-REFERENCE TO RELATED APPLICATIONS

This application is a continuation of International Application No. PCT/CN2020/090334, filed on May 14, 2020, which claims priority to the Patent Application No. PCT/CN2020/074441, filed on Feb. 6, 2020 and entitled "Configuration Method for Sidelink Configured Grant, Device and Storage Medium", the Patent Application No. PCT/CN2020/082818, filed on Apr. 1, 2020 and entitled "Configuration Method for Sidelink Configured Grant, Device and Storage Medium", and the Patent Application No. PCT/CN2020/083031, filed on Apr. 2, 2020 and entitled "Configuration Method for Sidelink Configured Grant, Device and Storage Medium". All the afore-mentioned applications are hereby incorporated by reference in their entireties.

TECHNICAL FIELD

Embodiments of the present application relate to the field of communication technologies and, in particular, to a configuration method for a sidelink configured grant, a device and storage medium.

BACKGROUND

With the development of communication technology, the application of Vehicle-to-Everything (V2X for short) technology is becoming more and more extensive. V2X employs a Device-to-Device (D2D) communication mode, which is a communication mode based on sidelink (SL) transmission technology, and hence has higher spectral efficiency and lower transmission delay.

In New Radio (NR) Vehicle-to-Everything, the following two resource allocation manners are supported. In one manner, a terminal selects transmission resources in a resource pool autonomously for sidelink transmission. In another manner, the network allocates sidelink transmission resources for the terminal. Specifically, the network may allocate sidelink transmission resources to the terminal by dynamic scheduling; or the network may allocate sidelink configured grant (CG) transmission resources to the terminal. There are mainly two types of resource allocation manners for CG: the first type is configured grant type-1 CG and the second type is configured grant type-2 CG.

For the manner of the network allocating sidelink CG transmission resources to the terminal, a configuration signaling of the CG transmission resources provided by the network to the terminal includes at least the following parameters: a slot offset and a period. The terminal determines time domain positions of the CG transmission resources according to the slot offset and the period. The slot offset refers to the quantity of slots which a slot of the first CG transmission resource is offset by relative to the first slot in a system frame number (SFN) period (or a direct frame number (DFN) period). The period refers to a period of the sidelink configured granted transmission resources. In the above solution, available CG transmission resources in different SFN periods (or DFN periods) correspond to different time domain positions. For example, in FIG. 1, a resource pool contains 3033 slots in one SFN period. If the slot offset in configuration parameters is 2 and the period is 4, then available slots for CG transmission resources in the first SFN period are respectively slots 2, 6, 10, . . . , 3030, and available slots for CG transmission resources in the second SFN period are respectively slots 1, 5, 9, . . . , 3029, and so on. Therefore, if the configuration signaling is transmitted at least twice (including the first transmission and retransmission) when crossing a boundary of the SFN periods, the terminal does not know the first slot of which SFN period the slot offset parameter in the configuration signaling is for. Assuming that the network sends the configuration signaling in the first SFN period for the first time, but the terminal receives the retransmitted configuration signaling in the second SFN period, then the terminal does not know whether the available slots for the sidelink configured grant transmission resources in the second SFN period are 1, 5, 9, . . . , 3029, or 2, 6, 10, . . . , 3030. Therefore, the available slots for the configured grant transmission resources determined by the terminal may be inaccurate.

SUMMARY

Embodiments of the present application provide a configuration method for a sidelink configured grant, a device and a storage medium, so as to improve accuracy of available slots for configured grant transmission resources determined by a terminal device.

In a first aspect, the embodiments of the present application can provide a configuration method for a sidelink configured grant, including:

sending, by a network device, a parameter for determining sidelink configured grant CG transmission resources, where the CG transmission resources have same time domain positions in different frame periods.

In a second aspect, the embodiments of the present application can provide a configuration method for a sidelink configured grant, including:

receiving, by a terminal device, a parameter for determining sidelink configured grants CG transmission resources, where the CG transmission resources have same time domain positions in different frame periods;

determining, by the terminal device, the CG transmission resources according to the parameter.

In a third aspect, the embodiments of the present application can provide a network device, including:

a first sending module, configured to send a parameter for determining sidelink configured grants CG transmission resources, where the CG transmission resources have same time domain positions in different frame periods.

In a fourth aspect, the embodiments of the present application can provide a terminal device, including:

a receiving module, configured to receive a parameter used for determining sidelink configured grant CG transmission resources, where the CG transmission resources have same time domain positions in different frame periods;

a processing module, configured to determine the CG transmission resources according to the parameter.

In a fifth aspect, the embodiments of the present application can further provide a network device, including:

a processor, a memory, an interface for communication with a terminal device;

the memory stores computer execution instructions;

the processor executes the computer execution instructions stored in the memory, to cause the processor to execute the configuration method provided in any one of the first aspect.

In a sixth aspect, the embodiments of the present application can further provide a terminal device, including:

a processor, a memory, an interface for communication with a network device;

the memory stores computer execution instructions;

the processor executes the computer execution instructions stored in the memory, to cause the processor to execute the configuration method provided in any one of the second aspect.

In a seventh aspect, the embodiments of the present application provide a computer-readable storage medium having computer execution instructions stored therein. When the computer execution instructions are executed by a processor, the configuration method described in any one of the first aspect is implemented.

In an eighth aspect, the embodiments of the present application provide a computer-readable storage medium having computer execution instructions stored therein. When the computer execution instructions are executed by a processor, the configuration method described in any one of the second aspect is implemented.

In a ninth aspect, the embodiments of the present application provide a program, which is used to execute the configuration method described in any one of the first aspect when executed by a processor.

In a tenth aspect, the embodiments of the present application further provide a program, which is used to execute the configuration method described in any one of the second aspect when executed by a processor.

In an implementation, the above processor may be a chip.

In an eleventh aspect, the embodiments of the present application provide a computer program product including program instructions, where the program instructions are used to implement the configuration method described in any one of the first aspect.

In a twelfth aspect, the embodiments of the present application provide a computer program product including program instructions, where the program instructions are used to implement the configuration method described in any one of the second aspect.

In a thirteenth aspect, the embodiments of the present application provide a chip, including: a processing module and a communication interface, where the processing module is capable of executing the configuration method described in any one of the first aspect.

Further, the chip further includes a storage module (e.g., a memory). The storage module is configured to store instructions. The processing module is configured to execute the instructions stored in the storage module, and the execution of the instructions stored in the storage module causes the processing module to execute the configuration method described in any one of the first aspect.

In a fourteenth aspect, the embodiments of the present application provide a chip, including: a processing module and a communication interface, where the processing module is capable of executing the configuration method described in any one of the second aspect.

Further, the chip further includes a storage module (e.g., a memory). The storage module is configured to store instructions. The processing module is configured to execute the instructions stored in the storage module, and the execution of the instructions stored in the storage module causes the processing module to execute the configuration method described in any one of the second aspect.

According to the configuration method for a sidelink configured grant, the device and the storage medium provided in the embodiments of the present application, the network device sends the parameter for determining the sidelink configured grant CG transmission resources, and the CG transmission resources determined by the terminal device according to the parameter have the same time domain positions in different frame periods. Therefore, the terminal device can accurately determine the time domain positions of the CG transmission resources no matter in which frame period the terminal device receives the parameter sent by the network device.

BRIEF DESCRIPTION OF DRAWINGS

In order to illustrate the technical solutions in embodiments of the present application or in the prior art more clearly, the following will briefly introduce the accompanying drawings which need to be used in the description of the embodiments or the prior art. Obviously, the accompanying drawings in the following description are some embodiments of the present application. For those of ordinary skill in the art, other drawings may also be obtained based on these drawings without any creative effort.

DESCRIPTION OF EMBODIMENTS

Figure 1:
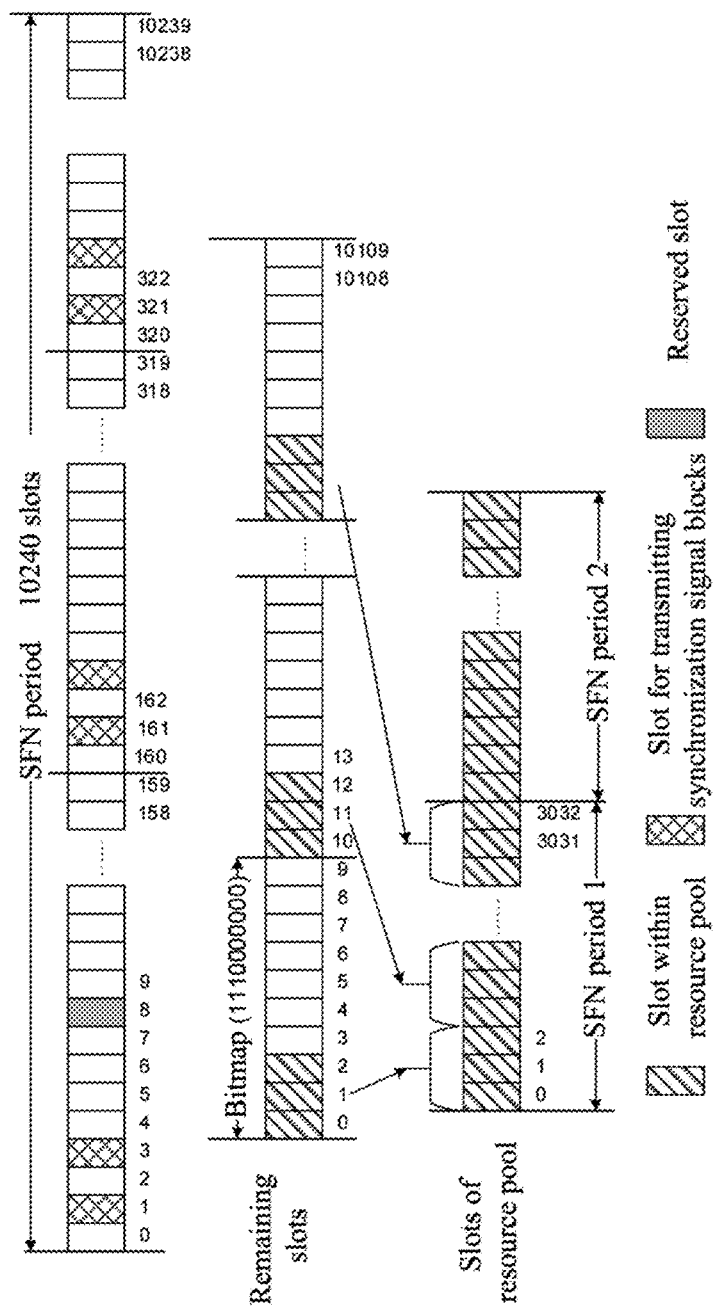
FIG. 1 is a schematic diagram of a principle of slot allocation provided by an embodiment of the present application.

In order to make the purposes, technical solutions and advantages of embodiments of the present application clearer, the technical solutions in the embodiments of the present application will be described clearly and comprehensively below with reference to the drawings in the embodiments of the present application. Obviously, the described embodiments are a part of the embodiments of the present application, but not all of the embodiments. Based on the embodiments in the present application, all other embodiments obtained by those of ordinary skill in the art without creative efforts should fall within the protection scope of the present application.

The terms "first", "second" and the like in the specification, claims and the above drawings of the embodiments of the present application are used to distinguish similar objects, and are not necessarily used to describe a specific sequence or order. It should be understood that the terms so used may be interchanged under appropriate circumstances such that the embodiments of the present application described herein can, for example, be implemented in sequences other than those illustrated or described herein. Furthermore, the terms "comprising" and "having" and any variations thereof, are intended to cover non-exclusive inclusion, for example, processes, methods, systems, products or devices including a series of steps or units are not necessarily limited to those steps or units explicitly listed, but may include other steps or units that are not explicitly listed or that are inherent to these processes, methods, products or devices.

At present, the application of Vehicle-to-Everything (V2X for short) technology is becoming more and more extensive. The device-to-device (D2D) communication mode which is a communication mode based on the sidelink (SL) transmission technology and thus has higher spectral efficiency and lower transmission delay is employed.

In New Radio (NR) Vehicle-to-Everything (NR-V2X), the following two resource allocation manners are supported. In one manner, a terminal selects transmission resources in a resource pool autonomously for sidelink transmission. In another manner, the network allocates sidelink transmission resources for the terminal. Specifically, the network may allocate sidelink transmission resources to the terminal by dynamic scheduling; or the network may allocate sidelink configured grant (CG) transmission resources to the terminal. There are mainly two types of resource allocation manners for CG: the first type is configured grant type-1 CG and the second type is configured grant type-2 CG.

Type-1 CG: The network configures sidelink transmission resources for the terminal through radio resource control (RRC) signaling. The RRC signaling configuration includes all transmission resources and transmission parameters including time domain resources, frequency domain resources, a demodulation reference signal (DMRS), a modulation and coding scheme (MCS), etc. When receiving this higher layer signaling, the terminal can perform sidelink transmission on the configured time-frequency resources using the configured transmission parameters immediately.

Type-2 CG: A two-step resource configuration manner is employed, that is, an RRC and Downlink Control Information (DCI) manner. First, an RRC signaling is used to configure transmission resources and transmission parameters including a period of time-frequency resources, a redundancy version, the quantity of retransmissions, the quantity of Hybrid Automatic Repeat reQuest (HARQ) processes, etc., and then DCI is used to activate the transmission of type-2 CG and configure other transmission resources and transmission parameters including time domain resources, frequency domain resources, an MCS, etc. The terminal may not perform sidelink transmission using the resources and parameters configured by this higher layer signaling immediately when receiving the RRC signaling, but has to wait for receiving the corresponding DCI activation and configuring other resources and transmission parameters before performing sidelink transmission.

The sidelink CG transmission resources allocated to the terminal by the network side are allocated from a resource pool, and the resource pool is a set of resources that are available for sidelink transmission. In an embodiment, the network side may configure the resource pool for the terminal through configuration information.

The following takes an SFN period as an example for illustration. One SFN period includes 10240 subframes, corresponding to subframes 0, 1, 2, . . . , 10239 respectively. Synchronization subframes, downlink subframes and special subframes are excluded, and remaining subframes are renumbered as $(l_0, l_1, \ldots, l_{(10240-N_{S-SSB}-N_{dssf}-1)})$, where $N_{(S-SSB)}$ represents the quantity of synchronization subframes, and $N_{dssf}$ represents the quantity of downlink subframes and special subframes. A subframe $l_r(0 \leq (10240-N_{S-SSB}-N_{dssf}))$ belongs to a reserved subframe if r satisfies the following condition:

$$r = \left\lfloor \frac{m \cdot (10240 - N_{S-SSB} - N_{dssf})}{N_{reserved}} \right\rfloor;$$

where m=0, . . . , $N_{reserved}-1$, $N_{reserved}=(10240-N_{S-SSB}-N_{dssf})$mod $L_{bitmap}$. $L_{bitmap}$ represents the length of a bitmap used to indicate time domain resources of the resource pool.

The terminal determines the resource pool as follows.

The total quantity of subframes included in one SFN period is 10240. The synchronization subframes, the downlink subframes, the special subframes and the reserved subframes are excluded, and remaining subframes are renumbered as $(t_0^{SL}, t_1^{SL}, \ldots, t_{T_{max}}^{SL})$. The quantity of the remaining subframes can be divided by $L_{bitmap}$. A bitmap $(b_0, b_1, \ldots, b_{L_{bitmap}-1})$ repeats in the remaining subframes periodically, and a bit being 1 indicates that a subframe corresponding to the bit in the remaining subframes belongs to the resource pool, otherwise, not belonging to the resource pool.

That is, subframes belonging to the resource pool are $t_k^{SL}(0 \leq k < (10240-N_{S-SSB}-N_{dssf}-N_{reserved}))$, where $b_{k'}=1$, k'=k mod $L_{bitmap}$.

For a subcarrier spacing of 15 kHz, the quantity of subframes and the quantity of slots in one SFN period is the same. Therefore, slots are taken as an example for illustration in the following embodiments. In the following embodiments of the present application, the subcarrier spacing of 15 kHz is taken as an example for illustration, and cases of other subcarrier spacings are similar.

In an embodiment, there are $N_{RP,slot}$ slots in one SFN period belonging to the resource pool, and the quantity of the slots in the resource pool may be determined by at least one of the following parameters: the total quantity of slots included in one SFN period, the quantity of slots occupied by synchronization signals in one SFN period, the quantity of reserved slots, the quantity of slots that are unavailable for sidelink transmission, the length of a bitmap, the quantity of bits with specific values in the bitmap. The slots that are unavailable for sidelink transmission are, for example, downlink subframes or special subframes in a TDD system, or downlink-only slots configured by a network in an NR system.

For example, $N_{RP,slot}$ is calculated by the following formula:

$$N_{RP,slot}=(N_{slot}-N_{S-SSB}-N_{reserved})/L_{bitmap} \times N_{bit-one}$$

where $N_{slot}$ represents the total quantity of all slots included in one SFN period, for example, $N_{slot}=10240 \times 2^\mu$, µ=0, 1, 2, 3, 4, corresponding to subcarrier spacings of 15 kHz, 30 kHz, 60 kHz, 120 kHz and 240 kHz respectively; $N_{S-SSB}$ represents the quantity of slots included in one SFN period for Sidelink Synchronization Signal Block (S-SSB) transmission; $N_{reserved}$ represents the quantity of reserved slots included in one SFN period; $L_{bitmap}$ represents the length of a bitmap used to indicate time domain resources of the resource pool; $N_{bit-one}$ represents the quantity of bits with a value of 1 (the value of 1 indicates that a slot corresponding to the bit belongs to the resource pool, and a value of 0 indicates that a slot corresponding to the bit does not belong to the resource pool) in the bitmap, or in other embodiments, may also represent the quantity of bits with preset values, which is not limited in the embodiments of the present application.

As shown in FIG. 1, one SFN period includes 10240 slots, a period of synchronization signals is 160 ms, and 2 synchronization slots are included within one synchronization period. Therefore, there are 128 synchronization slots in one SFN period. The length of a bitmap for indicating time domain resources of a resource pool is 10 bits, so 2 reserved slots are required, and the quantity of remaining slots is (10240−128−2=10110), which may be divisible by the length 10 of the bitmap. The remaining slots are renumbered as 0, 1, 2, . . . , 10109. First 3 bits of the bitmap are 1, and the remaining 7 bits are 0, that is, in the remaining slots, the first 3 slots of every 10 slots belong to the resource pool, and the remaining slots do not belong to the resource pool. Since the bitmap needs to be repeated 1011 times in the remaining slots to indicate whether all the slots belong to the resource pool, and 3 slots are included within each bitmap period, there are 3033 slots in one SFN period belonging to the resource pool.

For the resource allocation manner of type-1 CG, a configuration signaling of the CG transmission resources provided by the network to the terminal includes at least the following parameters: a slot offset and a period. Time domain positions of the CG transmission resources are determined according to the slot offset and the period; where the slot offset refers to the quantity of slots which a slot of the first CG transmission resource is offset by relative to the first slot in the system frame number (SFN) period (or the direct frame number (DFN) period); the period refers to a period of the sidelink configured granted transmission resources. In the above solution, available CG transmission resources in different SFN periods (or DFN periods) correspond to different time domain positions. For example, in FIG. 1, a resource pool contains 3033 slots in one SFN period. If the slot offset in configuration parameters is 2 and the period is 4, then available slots for CG transmission resources in the first SFN period are respectively slots 2, 6, 10, . . . , 3030, and available slots for CG transmission resources in the second SFN period are respectively slots 1, 5, 9, . . . , 3029, and so on. Therefore, if the configuration signaling is transmitted at least twice (including the first transmission and retransmission) when crossing a boundary of the SFN periods, the terminal does not know the first slot of which SFN period the slot offset parameter in the configuration signaling is for. Assuming that the network sends the configuration signaling in the first SFN period for the first time, but the terminal receives the retransmitted configuration signaling in the second SFN period, then the terminal does not know whether the available slots for the sidelink configured grant transmission resources in the second SFN period are 1, 5, 9, . . . , 3029, or 2, 6, 10, . . . , 3030. Therefore, the available slots for the configured grant transmission resources determined by the terminal device may be inaccurate.

The technical solutions of the present application will be described in detail below with specific embodiments. The following specific embodiments may be combined with each other, and the same or similar concepts or processes may not be repeated in some embodiments.

Figure 2:
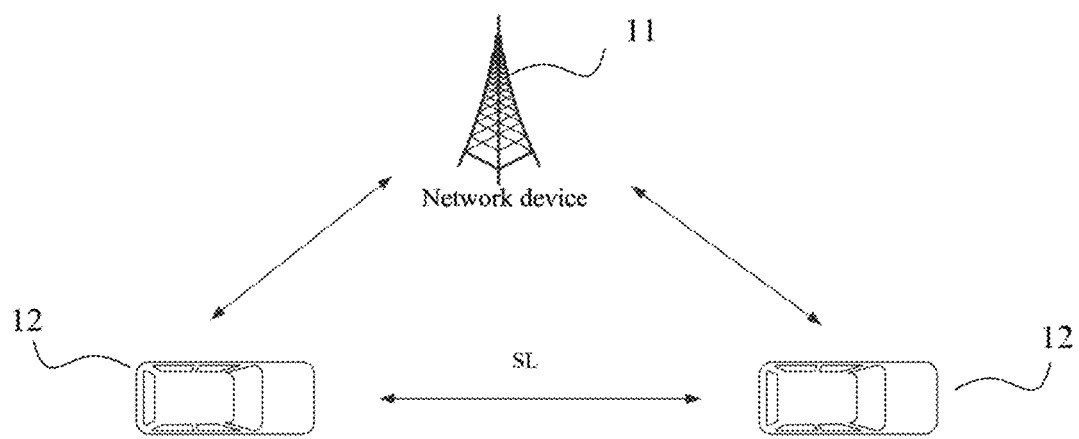
FIG. 2 is a schematic diagram of a communication system applied in an embodiment of the present application.

FIG. 2 is a schematic diagram of a communication system applied in an embodiment of the present application. As shown in FIG. 2, the communication system includes at least a network device 11 and a terminal device 12. It should be understood that, in an actual communication system, there may be one or more network devices 11 and terminal devices 12. In FIG. 2, one network device and two terminal devices 12 are taken as examples.

In FIG. 2, the network device 11 may be an access network device, for example, may be an access device in an LTE network and its evolved network, such as an evolved base station (Evolutional Node B, eNB or eNodeB for short), or may also include a next generation node B (gNB) in a 5G NR system, or a relay station, or a base station in a new network system in future, etc.

The terminal device 12 may also be referred to as a mobile terminal, a user equipment (UE for short), an access terminal, a subscriber unit, a subscriber station, a mobile station, a mobile radio station, a user terminal, a terminal, a wireless communication device, a user agent or a user device. Specifically, it may be a smart phone, a cellular phone, a cordless phone, a personal digital assistant (PDA) device, a handheld device with a wireless communication function or other processing device connected to a wireless modem, a vehicle-mounted device, a wearable device, etc. In the embodiments of the present application, the terminal device has an interface for communicating with the network device.

The inventive concept of the methods in the embodiments of the present application is as follows: parameters of configured grant transmission resources determined by the network device can ensure that available CG transmission resources in different SFN periods (or DFN periods) have the same time domain positions. For example in FIG. 3, available slots for CG transmission resources in SFN period 1 are slots 2, 5, 8, . . . , 3032, respectively; available slots for CG transmission resources in SFN period 2 are slots 2, 5, 8, . . . , 3032; and available slots in subsequent SFN periods are also slots 2, 5, 8, . . . , 3032.

The technical solutions of the present application will be described in detail below with specific embodiments. The following specific embodiments may be combined with each other, and the same or similar concepts or processes may not be repeated in some embodiments.

Figure 4:
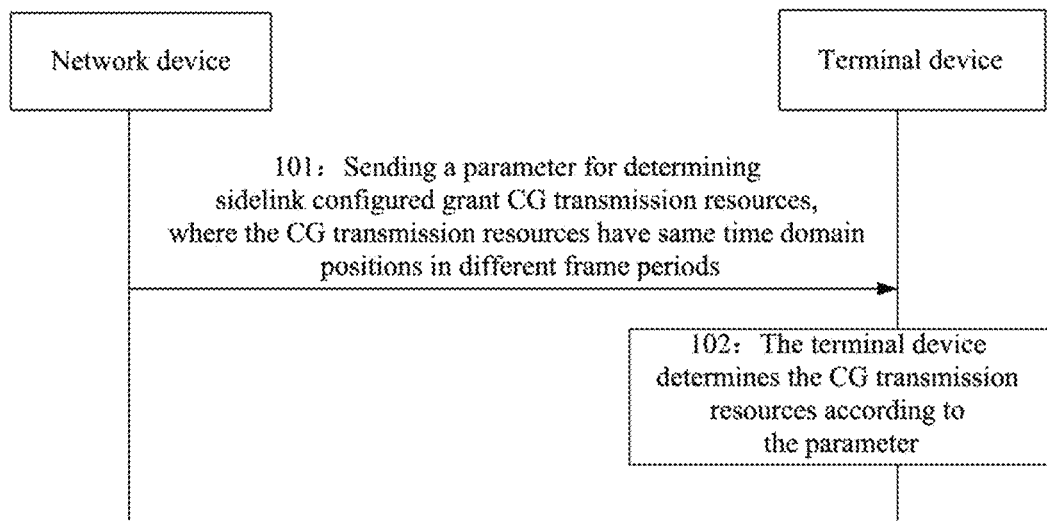
FIG. 4 is an interaction flowchart of an embodiment of a configuration method provided by the present application.

FIG. 4 is an interaction flowchart of an embodiment of a configuration method provided by the present application. As shown in FIG. 4, specific implementation steps of this embodiment include:

step 101: a network device sends a parameter for determining sidelink configured grant CG transmission resources, where the CG transmission resources have same time domain positions in different frame periods.

In an embodiment, the frame period is a system frame number SFN period or a direct frame number DFN period. In the following embodiments, the frame period being the SFN period is taken as an example for illustration.

For example, in one SFN period, time domain resources of the CG transmission resources are slots C1, C2, C3, and so on. C1 is the time domain position of the first CG transmission resource in one resource pool within the SFN period; C2, C3 and other subsequent resources are determined according to the time domain resource of C1 and the period of the sidelink CG transmission resources. In different SFN periods, the CG transmission resources are transmission resources corresponding to slots C1, C2, C3, . . . within the SFN period, that is, in different SFN periods, the time domain positions (i.e., relative positions in time domain) of the CG transmission resources are the same.

In order to satisfy that the CG transmission resources have the same time domain positions in different frame periods, in an embodiment, the parameter configured by the network device needs to meet the following preset condition: the total quantity of slots belonging to a first resource pool within one frame period is divisible by the period of the CG transmission resources.

The first resource pool is a set of resources available for sidelink transmission, and the CG transmission resource are transmission resources belonging to the first resource pool.

In an embodiment, the preset condition may be embodied by the following formula (or other variants of the formula):

$$\mathrm{mod}(N_{RP,slot}, P)=0$$

where $N_{RP,slot}$ represents the total quantity of slots belonging to the first resource pool within one frame period, and mod( ) represents an operation of taking remainder.

In an embodiment, the network side may configure the first resource pool for the terminal device through configuration information. Transmission resources in the first resource pool are available for the terminal device to perform sidelink transmission, and the network side allocates the sidelink CG transmission resources for the terminal device from the first resource pool.

The parameter $N_{RP,slot}$ may be determined according to at least one of the following parameters including: the total quantity of original slots within the frame period, the total quantity of original slots is $10240\times2^\mu$, where the parameter $\mu$ is determined according to a subcarrier spacing, $\mu=0, 1, 2, 3, 4$, corresponding to subcarrier spacings of 15 kHz, 30 kHz, 60 kHz, 120 kHz and 240 kHz respectively; the quantity of slots for transmitting synchronization signal blocks within the frame period; the quantity of reserved slots within the frame period; the quantity of slots that are unavailable for sidelink transmission; the quantity of bits with preset values in a bitmap and the length of the bitmap. The quantity of bits with the preset values in the bitmap is, for example, the quantity of bits with a value of 1 in the bitmap.

P represents the period of the CG transmission resources, in units of slots.

In an embodiment, the parameter for determining the CG transmission resources further includes: a slot offset $N_{offset}$, where for any one of the frame periods, the slot offset is used to determine the time domain position of the first CG transmission resource belonging to the first resource pool in the frame period, and $N_{offset}$ represents a slot offset of the first CG transmission resource relative to the first slot belonging to the first resource pool within the frame period, and is used to determine the slot position of the first CG transmission resource in each frame period.

In an embodiment, a value range of the slot offset $N_{offset}$ is [0, P-1]. The slot offset may be represented by the quantity of slots.

Figure 3:
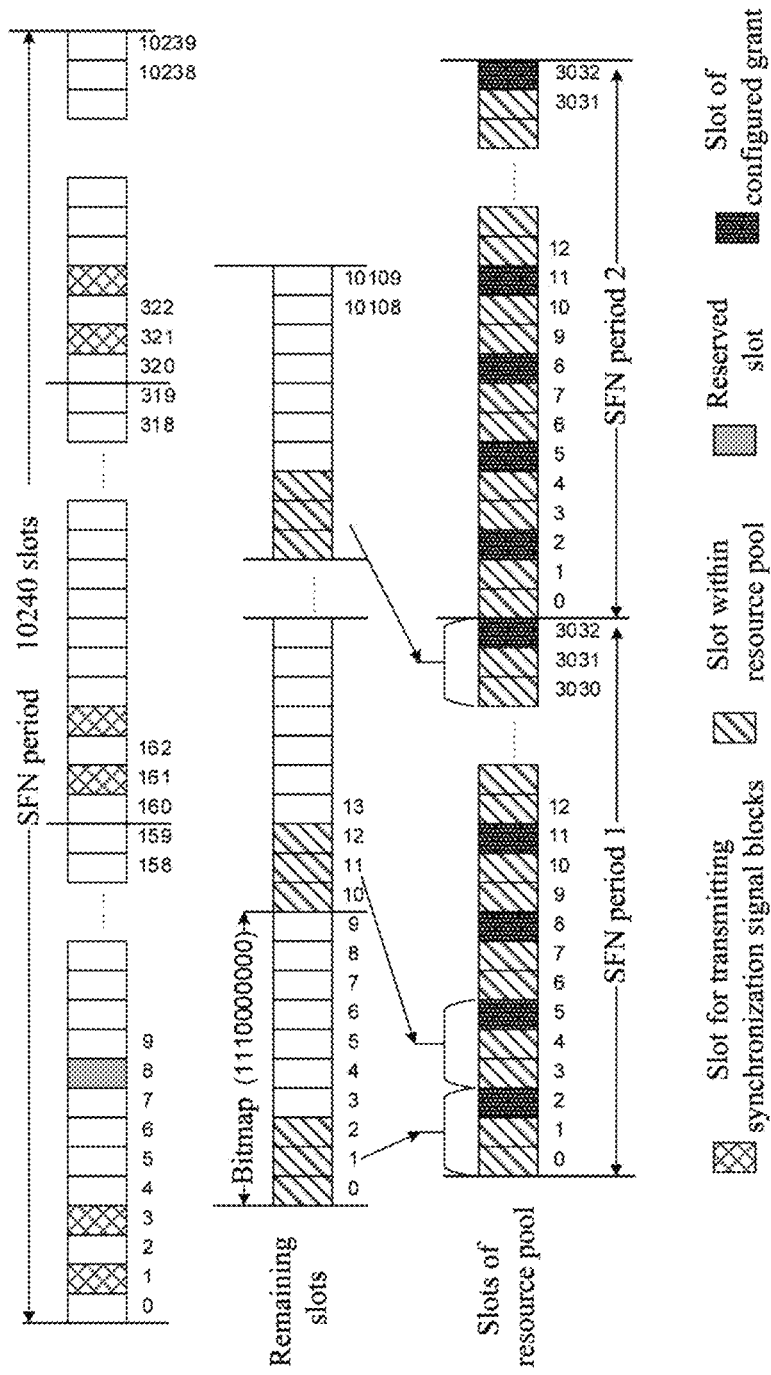
FIG. 3 is a schematic diagram of a principle of slot allocation provided by another embodiment of the present application.

In an embodiment, as shown in FIG. 3, if the parameter $N_{offset}$ of the CG transmission resources configured by the network is $N_{offset}=2$, it means that the offset of the slot of the first CG transmission resource relative to the first slot of the first resource pool in the frame period is 2 slots, that is, the slot of the first CG transmission resource is the third slot belonging to the first resource pool within the frame period (the slot number starting from 0). The period of the CG transmission resources is P=3.

According to the above parameter configuration, in one SFN period, the sidelink CG transmission resources correspond to the slots 2, 5, 8, 11, . . . , 3032 in the first resource pool respectively; further, since the above preset condition is met, in different SFN periods, the time domain positions of the sidelink CG transmission resources are the same.

In the above implementation, a specific relationship needs to be met between the parameter for determining the CG transmission resources (such as the period of the CG transmission resources) and the parameter of the time domain resources of the resource pool (such as the total quantity of slots belonging to the first resource pool within the frame period), so that the time domain resources of the CG transmission resources are the same within different frame periods.

Step 102: the terminal device determines the CG transmission resources according to the parameter.

The terminal device receives the above parameter for determining the CG transmission resources which is sent by the network device, determines available CG transmission resources according to the parameter, and transmits data using the CG transmission resources.

In the method of this embodiment, the network device sends the parameter for determining the sidelink configured grant CG transmission resources, and the CG transmission resources determined by the terminal device according to the parameter have the same time domain positions in different frame periods. Therefore, the terminal device can accurately determine the time domain positions of the CG transmission resources no matter in which frame period the terminal device receives the parameter sent by the network device.

In an embodiment, the method further includes:

the network device sends first configuration information, where the first configuration information is used to determine at least one second resource pool, and the at least one second resource pool includes the first resource pool; the CG transmission resources are transmission resources belonging to the first resource pool.

In an embodiment, the first configuration information may be a radio resource control RRC signaling or a system information block (System Information Block, SIB).

Specifically, the first resource pool may be determined by the first configuration information sent by the network device, and the CG transmission resources are the transmission resources in the first resource pool.

The first configuration information may configure at least one second resource pool, and the at least one second resource pool includes the first resource pool. The first configuration information is, for example, information used to indicate resources included in the second resource pool.

In an embodiment, step 101 may be implemented in the following manner:

the network device sends second configuration information, where the second configuration information includes the parameter for determining the CG transmission resources.

In an embodiment, the second configuration information is a radio resource control RRC signaling or a downlink control information DCI signaling.

The first configuration information and the second configuration information may be the same configuration information or different configuration information, which is not limited in the embodiments of the present application.

In an embodiment, for the type-1 CG, the network device may send the above parameter for determining the CG transmission resources through the second configuration information including, for example, the parameter of the CG transmission resources and the slot offset.

For example, if the period of the CG transmission resources configured by the network is 3 slots and the slot offset is 2 slots, the slots determined by the terminal device which belong to the first resource pool and which are available for sidelink transmission are {2, 5, 8, 11, . . . , 3032}. The time domain positions in each frame period are the same, that is, for each of all the frame periods, the slots which belong to the first resource pool and which are available for sidelink transmission are {2, 5, 8, 11, . . . , 3032}.

In an embodiment, for the type-2 CG, the network device sends the period of the CG transmission resources through the RRC signaling (or other higher layer signaling), and the network sends DCI to determine the time domain position of the first CG transmission resource belonging to the first resource pool in the frame period. For example, the slot in which the DCI is received is the time domain position of the first CG transmission resource. For example, if the period of the CG transmission resources configured by the network is 3 slots, and the slot in which the DCI is received is slot 7 in the current frame period, then the slots determined by the terminal device which belong to the first resource pool and which are available for sidelink transmission in the current frame period are {7, 10, 13, 17, ..., 3031}, and the slots which belong to the first resource pool and which are available for sidelink transmission in other subsequent frame periods are {1, 4, 7, 10, 13, 17, ..., 3031}.

In another embodiment, for the type-2 CG, the network device sends the period of the CG transmission resources through the RRC signaling (or other higher level signaling), and the network sends DCI to determine the time domain position of the first CG transmission resource belonging to the first resource pool in the frame period. For example, a slot offset is indicated by DCI, and is used to indicate the quantity of slots the slot of the first CG transmission resource belonging to the first resource pool in the frame period is offset by relative to the slot in which the DCI is received. The terminal device determines the position of the slot of the first CG transmission resource through the slot in which the DCI is received and the slot offset. For example, if the period of the CG transmission resources configured by the network is 3 slots, the slot in which the DCI is received is slot 7 in the current frame period, and the slot offset is 2, then the first CG transmission resource in the current frame period determined by the terminal device is slot 9, the slots which belong to the first resource pool and which are available for sidelink transmission in the frame period are {9, 12, 15, 18, ..., 3030}, and the slots which belong to the first resource pool and which are available for sidelink transmission in other subsequent frame periods are {0, 3, 6, 9, 12, 15, 18, ..., 3030}.

In an embodiment, for a case where sidelink transmission and uplink transmission share a carrier, the sidelink transmission may only use uplink slot or uplink symbol resources. At present, the total quantity $N_{slot}$ of original slots within the above-mentioned frame period represents the quantity of uplink slots available for sidelink transmission in one frame period.

Further, the following several specific implementations may be included.

In one case, only when all the symbols in an uplink slot are uplink symbols, the uplink slot may be used for sidelink transmission.

In another case, when some of the symbols in an uplink slot are uplink symbols, the uplink slot may also be used for sidelink transmission. Further, if the quantity of uplink symbols in an uplink slot is greater than a preset value, for example, the preset value is a preset value configured by the network, such as 7, then only when the quantity of uplink symbols in an uplink slot is greater than or equal to 7, the uplink slot is a slot available for sidelink transmission, otherwise it is an unavailable slot.

In other embodiments, the preset value may be predefined or determined in other ways, which is not limited in the present application.

In an embodiment, the uplink slot is an uplink slot configured according to a cell-level configuration signaling.

In an embodiment, the uplink symbol is an uplink symbol configured according to a cell-level configuration signaling.

The cell-level configuration signaling is, for example, a cell-level RRC configuration signaling, or other cell-level configuration signalings.

In other embodiments, the uplink slot and the uplink symbol may be configured according to other configuration signalings, which is not limited in the embodiments of the present application.

In an embodiment, the parameter configured by the network for determining the CG transmission resources is determined based on slots in the first resource pool, that is, determined based on logical slots of the first resource pool.

A physical slot is a slot position determined based on actual time, for example, slots 0, 1, 2, ..., 10239 in one SFN period in FIG. 3, which correspond to indexes of physical slots.

A logical slot is a slot position determined based on resources in the first resource pool. For example, slots corresponding to the resources in the first resource pool in FIG. 3 are logical slots, where logical slot 0 corresponds to physical slot 0, logical slot 1 corresponds to physical slot 2 (because physical slot 1 is a slot for transmitting a synchronization signal block and does not belong to the resources of the resource pool), logical slot 2 corresponds to physical slot 4 (because physical slot 3 is a slot for transmitting a synchronization signal block and does not belong to the resources of the resource pool).

The above period P of the CG transmission resources and the slot offset are both based on the logical slots of the first resource pool.

In the above implementation, the CG transmission resources determined by the terminal device according to the parameter sent by the network device have the same time domain positions in different frame periods. Therefore, the terminal device can accurately determine the time domain positions of the CG transmission resources no matter in which frame period the terminal device receives the parameter sent by the network device.

In yet another implementation, the sidelink configured grant transmission resources within any frame period may be determined through the following parameters:

a period parameter of the sidelink configured grant transmission resources;

the total quantity of slots of the first resource pool within one frame period;

slots of the sidelink configured grant transmission resources determined according to a network configuration signaling;

where the slots of the sidelink configured grant transmission resources determined according to the network configuration signaling are slots determined according to indication information of the sidelink configured grant transmission resources in a network RRC signaling (corresponding to the type-1 sidelink configured grant) or a DCI signaling (corresponding to the type-2 sidelink configured grant).

In an implementation, the slots of the sidelink configured grant transmission resources meet the following formula:

$$\text{Current\_slot} = (\text{TimeOffset} + S + N*P) \bmod (N_{RP,slot}).$$

Parameters in the above formula are described below respectively.

P: representing the period of the sidelink configured grant transmission resources.

$N_{RP,slot}$: representing the total quantity of slots of the first resource pool within one frame period.

TimeOffset: used to determine an offset of the sidelink configured grant transmission resources relative to SFN 0; or used to determine an offset of the sidelink configured grant transmission resources relative to the first slot of the first resource pool within one frame period.

S: representing a slot of a sidelink configured grant transmission resource determined according to the network configuration signaling. In an implementation, S represents a logical slot index of the sidelink configured grant transmission resource. If the network configures multiple sidelink transmission resources within one sidelink configured grant period, S respectively represents logical slot indexes of the multiple sidelink transmission resources. In an implementation, the configuration signaling for sidelink configured grant includes time domain indication information of the sidelink transmission resource, and the logical slot index is determined according to the time domain indication information. In an implementation, the slot is represented by a slot index within one sidelink configured grant resource period, that is, a value range of S is [0, P−1]. Or, the slot is represented by a slot index within one frame period, that is, a value range of S is [0, $N_{RP,slot}$−1].

Current_slot: representing a slot index corresponding to one slot belonging to the first resource pool within one frame period, where the parameter is represented by a logical slot index, and its value range is [0, $N_{RP,slot}$−1]. In an implementation, the parameter represents a slot index corresponding to one slot belonging to the first resource pool within any frame period; or the parameter represents a slot index corresponding to one slot belonging to the first resource pool within the frame period in which the configuration signaling for sidelink configured grant is received. For the type-1 sidelink configured grant, the configuration signaling is an RRC signaling for configuring the sidelink configured grant, and for the type-2 sidelink configured grant, the configuration signaling is a DCI signaling for activating the sidelink configured grant.

N represents an integer, optionally, N>=0.

modulo represents a modulo operation.

For example, $N_{RP,slot}$=3033, that is, the total quantity of slots belonging to the first resource pool within one frame period is 3033. The network configures the terminal with type-1 sidelink configured grant transmission resources, and indicates in the RRC signaling TimeOffset=5, P=100. A slot of a sidelink transmission resource determined according to the time domain resource indication information of the sidelink transmission resource is 10, that is, S=10. Then according to the above formula, it may be determined that the slots in which the sidelink configured grant transmission resources are located within one frame period are respectively: 15, 115, 215, 315, . . . , 2815, 2915, 3015.

For another example, $N_{RP,slot}$=3033, that is, the total quantity of slots belonging to the first resource pool within one frame period is 3033. The network configures the terminal with type-1 sidelink configured grant transmission resources, and indicates in the RRC signaling TimeOffset=505, P=100. A slot of a sidelink transmission resource determined according to the time domain resource indication information of the sidelink transmission resource is 10, that is, S=10. Then according to the above formula, it may be determined that the slots in which the sidelink configured grant transmission resources are located within one frame period are respectively: 15, 115, 215, 315, . . . , 2815, 2915, 3015. At this time, N may be less than 0 when determining the slots in which the sidelink transmission resources are located.

For another example, $N_{RP,slot}$=3033, that is, the total quantity of slots belonging to the first resource pool within one frame period is 3033. The network configures the terminal with type-1 sidelink configured grant transmission resources, indicates in the RRC signaling TimeOffset=505, P=100. Two sidelink transmission resources are configured within one sidelink configured grant period, and slots of the sidelink transmission resources determined according to the time domain resource indication information of the sidelink transmission resources are 10 and 15, that is, S=10 and S=15. Then according to the above formula, it may be determined that the slots in which the sidelink configured grant transmission resources are located within one frame period are respectively: 15, 20, 115, 120, 215, 220, 315, 320, . . . , 2815, 2820, 2915, 2920, 3015, 3020. At this time, N may be less than 0 when determining the slots in which the sidelink transmission resources are located.

For another example, $N_{RP,slot}$=3033, that is, the total quantity of slots belonging to the first resource pool within one frame period is 3033. The network configures the terminal with type-2 sidelink configured grant transmission resources, indicates in the RRC signaling TimeOffset=5, P=100, and indicates a sidelink transmission resource in DCI. For example, the network sends DCI in slot 10 to activate the sidelink configured grant, and the DCI carries sidelink transmission resource indication information which is used to indicate one sidelink transmission resource. A slot interval between this sidelink transmission resource and the DCI signaling is 5, that is, this sidelink transmission resource is located in slot 15, correspondingly, S=15. Then according to the above formula, it may be determined that the slots in which the sidelink configured grant transmission resources are located within one frame period are respectively: 20, 120, 220, 320, . . . , 2820, 2920, 3020.

For another example, $N_{RP,slot}$=3000, that is, the total quantity of slots belonging to the first resource pool within one frame period is 3000. The network configures the terminal with type-1 sidelink configured grant transmission resources, and indicates in the RRC signaling TimeOffset=5, P=100. A slot of a sidelink transmission resource determined according to the time domain resource indication information of the sidelink transmission resources is 10, that is, S=10. Then according to the above formula, it may be determined that the slots in which the sidelink configured grant transmission resources are located within one frame period are respectively: 15, 115, 215, 315, . . . , 2815, 2915.

In an implementation, if TimeOffset is not configured in the RRC signaling, TimeOffset may not be included in the above formula, or its value may be set to 0.

In an implementation, the slots of the sidelink configured grant transmission resources meet the following formula:

Current_slot=(S+N*P)modulo($N_{RP,slot}$).

Parameters in the above formula are described below respectively.

P: representing the period parameter of the sidelink configured grant transmission resources.

$N_{RP,slot}$: representing the total quantity of slots of the first resource pool within one frame period.

S: representing a slot of a sidelink configured grant transmission resource determined according to the network configuration signaling. In an implementation, S represents a logical slot index of the sidelink configured grant transmission resources. If the network configures multiple sidelink transmission resources within one sidelink configured grant period, S respectively represents logical slot indexes of the multiple sidelink transmission resources. In an implementation, the slot is represented by a logical slot index within one frame period, that is, a value range of S is [0, $N_{RP,slot}-1$]. For the type-2 sidelink configured grant, the slot index is determined according to a slot index corresponding to the DCI signaling and the time domain indication information of the sidelink transmission resource.

Current_slot: representing a slot index corresponding to one slot belonging to the first resource pool within one frame period, where the parameter is represented by a logical slot index, and its value range is [0, $N_{RP,slot}-1$].

N represents an integer.

For example, $N_{RP,slot}=3033$, that is, the total quantity of slots belonging to the first resource pool within one frame period is 3033. The network configures the terminal with type-2 sidelink configured grant transmission resources, indicates in the RRC signaling P=100, and indicates a sidelink transmission resource in DCI. For example, the network sends DCI in slot 10 to activate the sidelink configured grant, and the DCI carries sidelink transmission resource indication information which is used to indicate one sidelink transmission resource. A slot interval between this sidelink transmission resource and the DCI signaling is 5, that is, this sidelink transmission resource is located in slot 15, correspondingly, S=15. Then according to the above formula, it may be determined that the slots in which the sidelink configured grant transmission resources are located within one frame period are respectively: 15, 115, 215, 315, . . . , 2815, 2915, 3015.

For another example, $N_{RP,slot}=3033$, that is, the total quantity of slots belonging to the first resource pool within one frame period is 3033. The network configures the terminal with type-2 sidelink configured grant transmission resources, indicates in the RRC signaling P=100, and indicates a sidelink transmission resource in DCI. For example, the network sends DCI in slot 500 to activate the sidelink configured grant, and the DCI carries sidelink transmission resource indication information which is used to indicate one sidelink transmission resource. A slot interval between this sidelink transmission resource and the DCI signaling is 5, that is, this sidelink transmission resource is located in slot 505, correspondingly, S=505. Then according to the above formula, it may be determined that the slots in which the sidelink configured grant transmission resources are located within one frame period are respectively: 5, 105, 205, 305, . . . , 2805, 2905, 3005, and a value of N may be less than 0 at this time.

For another example, $N_{RP,slot}=3033$, that is, the total quantity of slots belonging to the first resource pool within one frame period is 3033. The network configures the terminal with type-2 sidelink configured grant transmission resources, indicates in the RRC signaling P=100, and indicates a sidelink transmission resource in DCI. For example, the network sends DCI in slot 1000 to activate the sidelink configured grant, and the DCI carries sidelink transmission resource indication information which is used to indicate two sidelink transmission resources. Slot intervals between the two sidelink transmission resources and the DCI signaling are 5 and 10, that is, the sidelink transmission resources are located in slots 1005 and 1010, correspondingly, S=1005 and S=1010. Then according to the above formula, it may be determined that the slots in which the sidelink configured grant transmission resources are located within one frame period are respectively: 5, 10, 105, 110, 205, 210, 305, 310, . . . , 2805, 2810, 2905, 2910, 3005, 3010. At this time, N may be less than 0 when determining the slots in which the sidelink transmission resources are located.

For another example, $N_{RP,slot}=3000$, that is, the total quantity of slots belonging to the first resource pool within one frame period is 3000. The network configures the terminal with type-2 sidelink configured grant transmission resources, indicates in the RRC signaling P=100, and indicates a sidelink transmission resource in DCI. For example, the network sends DCI in slot 10 to activate the sidelink configured grant, and the DCI carries sidelink transmission resource indication information which is used to indicate one sidelink transmission resource. A slot interval between this sidelink transmission resource and the DCI signaling is 5, that is, this sidelink transmission resource is located in slot 15, correspondingly, S=15. Then according to the above formula, it may be determined that the slots in which the sidelink configured grant transmission resources are located within one frame period are respectively: 15, 115, 215, 315, . . . , 2815, 2915.

In an implementation, the method for determining a slot of a configured grant transmission resource provided in the embodiments of the present application may be applicable to at least the following two situations.

Situation 1: The total quantity of slots belonging to the first resource pool within one frame period is divisible by the sidelink configured grant period.

Situation 2: The total quantity of slots belonging to the first resource pool within one frame period is indivisible by the sidelink configured grant period.

In order to satisfy that the CG transmission resources have the same time domain positions in different frame periods, in another embodiment, the parameter sent by the network device for determining the sidelink configured grant CG transmission resources includes: a period of the CG transmission resources. The period of the CG transmission resources meets the following preset condition: the total quantity of slots within the frame period is divisible by the period of the CG transmission resources.

In an embodiment, the preset condition may be embodied by the following formula (or other variants of the formula):

$$\mathrm{mod}(N_{slot}, P)=0$$

where $N_{slot}$ represents the total quantity of slots within one frame period, and mod( ) represents an operation of taking remainder.

P represents the period of the CG transmission resources, in units of slots or time length. For example, the period is 100 milliseconds, or 100 slots.

In an embodiment, the total quantity $N_{slot}$ of slots within the frame period is $10240\times2^\mu$, where the parameter $\mu$ is determined according to a subcarrier spacing.

$\mu=0, 1, 2, 3$, and 4, corresponding to subcarrier spacings of 15 kHz, 30 kHz, 60 kHz, 120 kHz, and 240 kHz respectively. For example, $N_{slot}$ in FIG. 1 is 10240.

For example, if $N_{slot}=10240$ and P=10, in the first SFN period, sidelink CG transmission resources correspond to slots 9, 19, 29, 39, . . . , 10239 in the SFN period respectively, in the second SFN period, sidelink CG transmission resources correspond to slots 9, 19, 29, 39, . . . , 10239 in the SFN period respectively, and so on.

The period of the CG transmission resources is represented based on the quantity of physical slots.

In an embodiment, the parameter for determining the sidelink configured grant CG transmission resources further includes a slot offset, where for any frame period, the slot offset is used to determine the time domain position of the first CG transmission resource in the frame period.

$N_{offset}'$ represents a slot offset of the first CG transmission resource relative to the first slot within the frame period, and is used to determine the slot position of the first CG transmission resource in each frame period.

For example, referring to the first row of slots in FIG. 1, if the parameter $N_{offset}'$ of the CG transmission resources configured by the network is $N_{offset}'=9$, it means that the offset of the slot of the first CG transmission resource relative to the first slot in the frame period is 9 slots, that is, the slot of the first CG transmission resource is the 10th slot (that is, slot 9, with the slot number starting from 0) within the frame period. The period of the CG transmission resources is P=10. The sidelink CG transmission resources correspond to slots 9, 19, 29, 39, . . . , 10239 in the SFN period respectively.

In order to satisfy that the CG transmission resources have the same time domain positions in different frame periods, in another embodiment, the parameter sent by the network device for determining the sidelink configured grant CG transmission resources includes: a period of the CG transmission resources. The period of the CG transmission resources meets the following preset condition: the total quantity of slots available for a resource pool within the frame period is divisible by the period of the CG transmission resources.

In an embodiment, the preset condition may be embodied by the following formula (or other variants of the formula):

$$\mod(N'_{slot}, P)=0$$

where $N'_{slot}$ represents the total quantity of slots available for the resource pool within one frame period, and mod( ) represents an operation of taking remainder.

P represents the period of the CG transmission resources, in units of slots or time length. For example, the period is 100 milliseconds, or 100 slots.

$N'_{slot}$ is a remaining slot after removing some slots that are unavailable for the resource pool from $N_{slot}$, such as remaining slots in FIG. 1. The period of the CG transmission resources is represented based on physical slots.

In an embodiment, the slots available for the resource pool within the frame period do not include a slot for transmitting a synchronization signal.

In an embodiment, the slots available for the resource pool within the frame period do not include a reserved slot.

For example, in the second row of slots in FIG. 1, slots for transmitting synchronization signals and reserved slots are excluded on the basis of the first row of slots, and the total quantity of remaining slots is 10110.

The period of the CG transmission resources is represented based on the quantity of physical slots.

In an embodiment, the method further includes:

determining sidelink broadcast information, where the sidelink broadcast information is used to determine the quantity of uplink slots or sidelink slots within a frame period, and the quantity of the uplink slots or the sidelink slots within the frame period is the total quantity of the slots available for the resource pool within the frame period.

Specifically, the network device may determine the sidelink broadcast information, and determine the quantity of the uplink slots or the sidelink slots within the frame period according to indication information carried in the sidelink broadcast information. The quantity of the uplink slots or the sidelink slots within the frame period is the total quantity of the slots available for the resource pool within the frame period.

In an embodiment, the parameter for determining the sidelink configured grant CG transmission resources further includes a slot offset, where for any frame period, the slot offset is used to determine the time domain position of the first CG transmission resource in the frame period.

$N_{offset}''$ represents a slot offset of the first CG transmission resource relative to the first slot available for the resource pool within the frame period, and is used to determine the time domain position of the first CG transmission resource in each frame period.

For example, referring to the first row of slots in FIG. 1, if the parameter $N_{offset}''$ of the CG transmission resources configured by the network is $N_{offset}''=12$, it means that the offset of the slot of the first CG transmission resource relative to the first slot in the frame period is 12 slots, that is, the slot of the first CG transmission resource is the 13th slot (that is, slot 12, with the slot number starting from 0) within the frame period. The period of the CG transmission resources is P=10. When determining slots of subsequent CG transmission resources, the slots for transmitting the synchronization signals and the reserved slots may be excluded.

Figure 5:
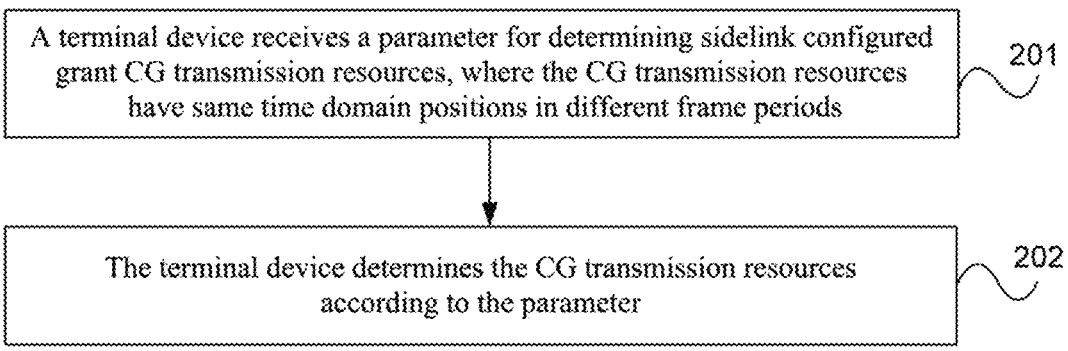
FIG. 5 is a flowchart of another embodiment of a configuration method provided by the present application.

FIG. 5 is a flowchart of another embodiment of a configuration method provided by the present application. As shown in FIG. 4 and FIG. 5, specific implementation steps of this embodiment include:

step 201: a terminal device receives a parameter for determining sidelink configured grant CG transmission resources, where the CG transmission resources have same time domain positions in different frame periods;

step 202: the terminal device determines the CG transmission resources according to the parameter.

In an embodiment, the frame period is a system frame number SFN period or a direct frame number DFN period. In the following embodiments, the frame period being the SFN period is taken as an example for illustration.

For example, in one SFN period, time domain resources of the CG transmission resources are slots C1, C2, C3, and so on. C1 is the time domain position of the first CG transmission resource in one resource pool within the SFN period; C2, C3 and other subsequent resources are determined according to the time domain resource of C1 and the period of the sidelink CG transmission resources. In different SFN periods, the CG transmission resources are transmission resources corresponding to slots C1, C2, C3, . . . within the SFN period, that is, in different SFN periods, the time domain positions (i.e., relative positions in time domain) of the CG transmission resources are the same.

In order to satisfy that the CG transmission resources have the same time domain positions in different frame periods, in an embodiment, the parameter configured by the network device needs to meet the following preset condition: the total quantity of slots belonging to a first resource pool within one frame period is divisible by the period of the CG transmission resources. The CG transmission resources are transmission resources belonging to the first resource pool.

The first resource pool is a set of resources available for sidelink transmission.

In an embodiment, the preset condition may be embodied by the following formula (or other variants of the formula):

$$\mod(N_{RP,slot}, P)=0$$

where $N_{RP,slot}$ represents the total quantity of slots belonging to the first resource pool within one frame period, and mod( ) represents an operation of taking remainder.

The parameter $N_{RP,slot}$ may be determined according to at least one of the following parameters including: the total quantity of original slots within the frame period, the total quantity of original slots is $10240 \times 2^\mu$, where the parameter $\mu$ is determined according to a subcarrier spacing, $\mu=0, 1, 2,$ 3, 4, corresponding to subcarrier spacings of 15 kHz, 30 kHz, 60 kHz, 120 kHz and 240 kHz respectively; the quantity of slots for transmitting synchronization signal blocks within the frame period; the quantity of reserved slots within the frame period; the quantity of slots that are unavailable for sidelink transmission; the quantity of bits with preset values in a bitmap and the length of the bitmap. The quantity of bits with the preset values in the bitmap is, for example, the quantity of bits with a value of 1 in the bitmap.

P represents the period of the CG transmission resources, in units of slots.

In an embodiment, the parameter for determining the CG transmission resources further includes: a slot offset $N_{offset}$, where for any one of the frame periods, the slot offset is used to determine the time domain position of the first CG transmission resource belonging to the first resource pool in the frame period, and $N_{offset}$ represents a slot offset of the first CG transmission resource relative to the first slot belonging to the first resource pool within the frame period, and is used to determine the slot position of the first CG transmission resource in each frame period.

In an embodiment, as shown in FIG. 3, if the parameter $N_{offset}$ of the CG transmission resources configured by the network is $N_{offset}=2$, it means that the offset of the slot of the first CG transmission resource relative to the first slot of the first resource pool in the frame period is 2 slots, that is, the slot of the first CG transmission resource is the third slot belonging to the first resource pool within the frame period (the slot number starting from 0). The period of the CG transmission resources is P=3.

According to the above parameter configuration, in one SFN period, the sidelink CG transmission resources correspond to the slots 2, 5, 8, 11, . . . , 3032 in the first resource pool respectively; further, since the above preset condition is met, in different SFN periods, the time domain positions of the sidelink CG transmission resources are the same.

The terminal device receives the above parameter for determining the CG transmission resources which is sent by the network device, determines available CG transmission resource according to the parameter, and transmits data using the CG transmission resources.

In the above implementation, a specific relationship needs to be met between the parameter for determining the CG transmission resources (such as the period of the CG transmission resources) and the parameter of the time domain resources of the resource pool (such as the total quantity of slots belonging to the first resource pool within the frame period), so that the time domain resources of the CG transmission resources are the same within different frame periods. Since the CG transmission resources determined by the terminal device according to the parameter have the same time domain positions in different frame periods, the terminal device can accurately determine the time domain positions of the CG transmission resources no matter in which frame period the terminal device receives the parameter sent by the network device.

In an embodiment, the method further includes:
the terminal device receives first configuration information, where the first configuration information is used to determine at least one second resource pool, and the at least one second resource pool includes the first resource pool;
the CG transmission resources are transmission resources belonging to the first resource pool.

In an embodiment, the first configuration information may be a radio resource control RRC signaling or a system information block SIB.

In an embodiment, the total quantity of slots belonging to the first resource pool within one frame period is the total quantity of slots available for sidelink transmission.

In an embodiment, the CG transmission resources have the same time domain positions in different frame periods of the first resource pool.

In an embodiment, the total quantity of slots belonging to the first resource pool within the frame period is determined according to at least one of the following parameters including: the total quantity of original slots within the frame period, the quantity of slots for transmitting synchronization signal blocks within the frame period, the quantity of reserved slots within the frame period, the quantity of slots that are unavailable for sidelink transmission, the quantity of bits with preset values in a bitmap, and the length of the bitmap. The bitmap is used to indicate positions of the time domain resources of the first resource pool in the frame period.

In an embodiment, the total quantity of original slots within the frame period is $10240 \times 2^{\mu}$, where the parameter $\mu$ is determined according to a subcarrier spacing.

In an embodiment, the total quantity of original slots within the frame period is the quantity of uplink slots available for sidelink transmission within the frame period.

In an embodiment, symbols in an uplink slot are all uplink symbols; or,
the quantity of uplink symbols in an uplink slot is greater than or equal to a preset value.

In an embodiment, the uplink slot is an uplink slot determined according to a cell-level configuration signaling.

In an embodiment, the uplink symbol is an uplink symbol determined according to a cell-level configuration signaling.

In an embodiment, that the terminal device receives the parameter for determining the sidelink configured grant CG transmission resources includes that:
the terminal device receives second configuration information, where the second configuration information includes the parameter.

In an embodiment, the second configuration information is a radio resource control RRC signaling or a downlink control information DCI signaling.

The first configuration information and the second configuration information may be the same configuration information or different configuration information, which is not limited in the embodiments of the present application.

In an embodiment, the parameter of the CG transmission resources is determined based on the slot number in the first resource pool.

In order to satisfy that the CG transmission resources have the same time domain positions in different frame periods, in another embodiment, the parameter for determining the sidelink configured grant CG transmission resources includes: a period of the CG transmission resources. The period of the CG transmission resources meets the following preset condition: the total quantity of slots within the frame period is divisible by the period of the CG transmission resources.

In an embodiment, the preset condition may be embodied by the following formula (or other variants of the formula):

$$\mathrm{mod}(N_{slot}, P) = 0$$

where $N_{slot}$ represents the total quantity of slots within one frame period, and mod( ) represents an operation of taking remainder.

P represents the period of the CG transmission resources, in units of slots or time length. For example, the period is 100 milliseconds, or 100 slots.

In an embodiment, the total quantity $N_{slot}$ of slots within the frame period is $10240 \times 2^\mu$, where the parameter $\mu$ is determined according to a subcarrier spacing.

$\mu=0, 1, 2, 3$, and 4, corresponding to subcarrier spacings of 15 kHz, 30 kHz, 60 kHz, 120 kHz, and 240 kHz respectively. For example, $N_{slot}$ in FIG. 1 is 10240.

For example, if $N_{slot}=10240$ and P=10, in the first SFN period, sidelink CG transmission resources correspond to slots 9, 19, 29, 39, . . . , 10239 in the SFN period respectively, in the second SFN period, sidelink CG transmission resources correspond to slots 9, 19, 29, 39, . . . , 10239 in the SFN period respectively, and so on.

The period of the CG transmission resources is represented based on the quantity of physical slots.

In an embodiment, the parameter for determining the sidelink configured grant CG transmission resources further includes a slot offset, where for any frame period, the slot offset is used to determine the time domain position of the first CG transmission resource in the frame period.

$N_{offset}'$ represents a slot offset of the first CG transmission resource relative to the first slot within the frame period, and is used to determine the slot position of the first CG transmission resource in each frame period.

For example, referring to the first row of slots in FIG. 1, if the parameter $N_{offset}'$ of the CG transmission resources configured by the network is $N_{offset}'=9$, it means that the offset of the slot of the first CG transmission resource relative to the first slot in the frame period is 9 slots, that is, the slot of the first CG transmission resource is the 10th slot (that is, slot 9, with the slot number starting from 0) within the frame period. The period of the CG transmission resources is P=10. The sidelink CG transmission resources correspond to slots 9, 19, 29, 39, . . . , 10239 in the SFN period respectively.

In order to satisfy that the CG transmission resources have the same time domain positions in different frame periods, in another embodiment, the parameter for determining the sidelink configured grant CG transmission resources includes: a period of the CG transmission resources. The period of the CG transmission resources meets the following preset condition: the total quantity of slots available for a resource pool within the frame period is divisible by the period of the CG transmission resources.

In an embodiment, the preset condition may be embodied by the following formula (or other variants of the formula):

$$\mathrm{mod}(N_{slot}', P)=0$$

where $N_{slot}'$ represents the total quantity of slots available for the resource pool within one frame period, and mod( ) represents an operation of taking remainder.

P represents the period of the CG transmission resources, in units of slots or time length. For example, the period is 100 milliseconds, or 100 slots.

$N_{slot}'$ is a remaining slot after removing some slots that are unavailable for the resource pool from $N_{slot}$, such as remaining slots in FIG. 1. The period of the CG transmission resources is represented based on physical slots.

In an embodiment, the slots available for the resource pool within the frame period do not include a slot for transmitting a synchronization signal.

In an embodiment, the slots available for the resource pool in the frame period do not include a reserved slot.

For example, in the second row of slots in FIG. 1, slots for transmitting synchronization signals and reserved slots are excluded on the basis of the first row of slots, and the total quantity of remaining slots is 10110.

The period of the CG transmission resources is represented based on the quantity of physical slots.

In an embodiment, the method further includes:

determining sidelink broadcast information, and determine the quantity of uplink slots or sidelink slots within a frame period according to the sidelink broadcast information, where the quantity of the uplink slots or the sidelink slots within the frame period is the total quantity of the slots available for the resource pool within the frame period.

Specifically, the terminal device determines the sidelink broadcast information, and determines the quantity of the uplink slots or the sidelink slots within the frame period according to the sidelink broadcast information. The quantity of the uplink slots or the sidelink slots within the frame period is the total quantity of the slots available for the resource pool within the frame period.

In an embodiment, the parameter for determining the sidelink configured grant CG transmission resources further includes a slot offset, where for any frame period, the slot offset is used to determine the time domain position of the first CG transmission resource in the frame period.

$N_{offset}''$ represents a slot offset of the first CG transmission resource relative to the first slot available for the resource pool within the frame period, and is used to determine the time domain position of the first CG transmission resource in each frame period.

For example, referring to the first row of slots in FIG. 1, if the parameter $N_{offset}''$ of the CG transmission resources configured by the network is $N_{offset}''=12$, it means that the offset of the slot of the first CG transmission resource relative to the first slot in the frame period is 12 slots, that is, the slot of the first CG transmission resource is the 13th slot (that is, slot 12, with the slot number starting from 0) within the frame period. The period of the CG transmission resources is P=10. When determining slots of subsequent CG transmission resources, the slots for transmitting the synchronization signals and the reserved slots may be excluded.

The implementation principle and technical effects of the method in this embodiment are similar to those of the foregoing method embodiments of the network device side. Please refer to the foregoing embodiments, which will not be repeated here.

Figure 6:
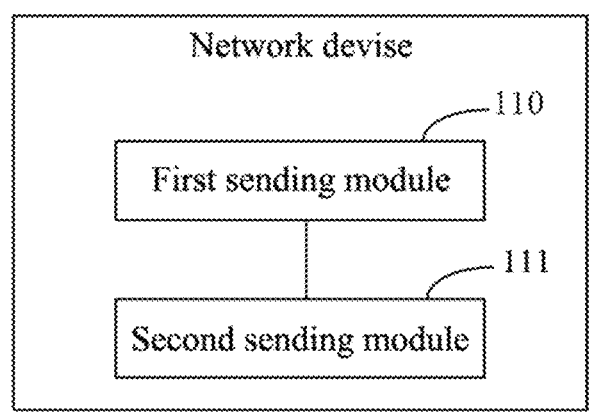
FIG. 6 is a schematic structural diagram of Embodiment 1 of a network device provided by the present application.

FIG. 6 is a schematic structural diagram of Embodiment 1 of a network device provided by the present application. As shown in FIG. 6, the network device includes:

a first sending module 110, configured to send a parameter for determining sidelink configured grant CG transmission resources, where the CG transmission resources have same time domain positions in different frame periods.

In a possible implementation, the parameter includes a period of the CG transmission resources; the period of the CG transmission resources meets the following preset condition: the total quantity of slots belonging to a first resource pool within the frame period is divisible by the period of the CG transmission resources; and the CG transmission resources are transmission resources belonging to the first resource pool.

In a possible implementation, the network device also includes:

a second sending module 111, configured to send first configuration information, where the first configuration information is used to determine at least one second resource pool, and the at least one second resource pool includes the first resource pool.

In a possible implementation, the CG transmission resources have the same time domain positions in different frame periods of the first resource pool.

In a possible implementation, the parameter for determining the sidelink configured grant CG transmission resources is determined based on the slot number in the first resource pool.

In a possible implementation, the total quantity of slots belonging to the first resource pool within the frame period is determined according to at least one of the following parameters including: the total quantity of original slots within the frame period, the quantity of slots for transmitting synchronization signal blocks within the frame period, the quantity of reserved slots within the frame period, the quantity of slots that are unavailable for sidelink transmission, the quantity of bits with preset values in a bitmap, and the length of the bitmap. The bitmap is used to indicate positions of time domain resources of the first resource pool in the frame period.

In a possible implementation, the total quantity of original slots within the frame period is $10240 \times 2^\mu$, where the parameter $\mu$ is determined according to a subcarrier spacing.

In a possible implementation, the total quantity of original slots within the frame period is the quantity of uplink slots available for sidelink transmission within the frame period.

In a possible implementation, symbols in the uplink slots are all uplink symbols; or, the quantity of uplink symbols in the uplink slots is greater than or equal to a preset value.

In a possible implementation, the uplink slots are uplink slots determined according to a cell-level configuration signaling.

In a possible implementation, the uplink symbols are uplink symbols determined according to a cell-level configuration signaling.

In a possible implementation, the parameter includes a period of the CG transmission resources; the period of the CG transmission resources meets the following preset condition: the total quantity of slots within the frame period is divisible by the period of the CG transmission resources.

In a possible implementation, the total quantity of slots within the frame period is $10240 \times 2^\mu$, where the parameter $\mu$ is determined according to a subcarrier spacing.

In a possible implementation, the parameter includes a period of the CG transmission resources; the period of the CG transmission resources meets the following preset condition: the total quantity of slots available for the resource pool within the frame period is divisible by the period of the CG transmission resources.

In a possible implementation, the slots available for the resource pool within the frame period do not include a slot for transmitting a synchronization signal.

In a possible implementation, the slots available for the resource pool within the frame period do not include a reserved slot.

In a possible implementation, the network device further includes:

a determining module, configured to determine sidelink broadcast information, where the sidelink broadcast information is used to determine the quantity of uplink slots or sidelink slots within the frame period, where the quantity of the uplink slots or the sidelink slots within the frame period is the total quantity of slots available for the resource pool within the frame period.

In a possible implementation, the period of the CG transmission resources is represented based on the quantity of physical slots.

In a possible implementation, the first sending module 110 is specifically configured to:

send second configuration information, where the second configuration information includes the parameter.

In a possible implementation, the second configuration information is a radio resource control RRC signaling or a downlink control information DCI signaling.

In a possible implementation, the frame period is a system frame number SFN period or a direct frame number DFN period.

In a possible implementation, the parameter further includes a slot offset, where for any one of the frame periods, the slot offset is used to determine the time domain position of the first CG transmission resource belonging to the first resource pool in the frame period.

In a possible implementation, the parameter further includes a slot offset, where for any one of the frame periods, the slot offset is used to determine the time domain position of the first CG transmission resource in the frame period.

In a possible implementation, the time domain positions of the CG transmission resources in the frame period are determined according to the following parameters:

the period of the CG transmission resources;

the total quantity of slots belonging to the first resource pool within the frame period;

a slot index of a sidelink configured grant transmission resource determined according to the second configuration information.

In a possible implementation, the time domain positions of the CG transmission resources in the frame period are further determined according to the slot offset.

In a possible implementation, the slot index of the sidelink configured grant transmission resource is a slot index within one period of the sidelink configured grant transmission resources; or, the slot index of the sidelink configured grant transmission resource is a slot index within the frame period.

The network device provided by any of the above implementations is used to execute the technical solution on the network device side in any of the above method embodiments, and the implementation principles and technical effects thereof are similar, which will be not repeated here.

Figure 7:
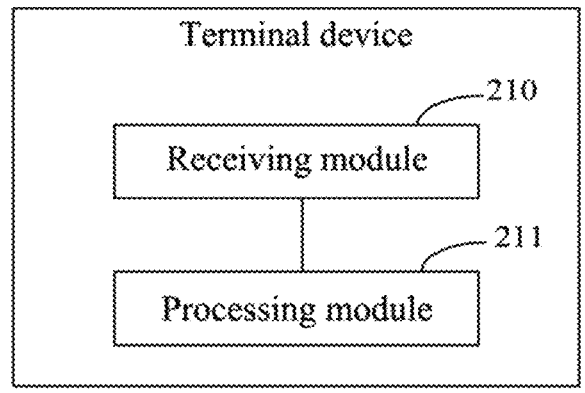
FIG. 7 is a schematic structural diagram of Embodiment 1 of a terminal device provided by the present application.

FIG. 7 is a schematic structural diagram of Embodiment 1 of a terminal device provided by the present application. As shown in FIG. 7, the terminal device includes:

a receiving module 210, configured to receive a parameter for determining sidelink configured grant CG transmission resources, where the CG transmission resources have same time domain positions in different frame periods;

a processing module 211, configured to determine the CG transmission resources according to the parameter.

In a possible implementation, the parameter includes a period of the CG transmission resources; the period of the CG transmission resources meets the following preset condition: the total quantity of slots belonging to a first resource pool within the frame period is divisible by the period of the CG transmission resources; and the CG transmission resources are transmission resources belonging to the first resource pool.

In a possible implementation, the receiving module 210 is further configured to:

receive first configuration information, where the first configuration information is used to determine at least one second resource pool, and the at least one second resource pool includes the first resource pool.

The CG transmission resources are transmission resources belonging to the first resource pool.

In a possible implementation, the CG transmission resources have the same time domain positions in different frame periods of the first resource pool.

In a possible implementation, the parameter for determining the sidelink configured grant CG transmission resources is determined based on the slot number in the first resource pool.

In a possible implementation, the total quantity of slots belonging to the first resource pool within the frame period is determined according to at least one of the following parameters including: the total quantity of original slots within the frame period, the quantity of slots for transmitting synchronization signal blocks within the frame period, the quantity of reserved slots within the frame period, the quantity of slots that are unavailable for sidelink transmission, the quantity of bits with preset values in a bitmap and the length of the bitmap. The bitmap is used to indicate positions of time domain resources of the first resource pool in the frame period.

In a possible implementation, the total quantity of original slots within the frame period is $10240 \times 2^\mu$, where the parameter $\mu$ is determined according to a subcarrier spacing.

In a possible implementation, the total quantity of original slots within the frame period is the quantity of uplink slots available for sidelink transmission within the frame period.

In a possible implementation, symbols in the uplink slots are all uplink symbols; or, the quantity of uplink symbols in the uplink slots is greater than or equal to a preset value.

In a possible implementation, the uplink slots are uplink slots determined according to a cell-level configuration signaling.

In a possible implementation, the uplink symbols are uplink symbols determined according to a cell-level configuration signaling.

In a possible implementation, the parameter includes a period of the CG transmission resources; the period of the CG transmission resource meets the following preset condition: the total quantity of slots within the frame period is divisible by the period of CG transmission resources.

In a possible implementation, the total quantity of slots within the frame period is $10240 \times 2^\mu$, where the parameter $\mu$ is determined according to a subcarrier spacing.

In a possible implementation, the parameter includes a period of the CG transmission resources; the period of the CG transmission resources meets the following preset condition: the total quantity of slots available for the resource pool within the frame period is divisible by the period of the CG transmission resources.

In a possible implementation, the slots available for the resource pool within the frame period do not include a slot for transmitting a synchronization signal.

In a possible implementation, the slots available for the resource pool within the frame period do not include a reserved slot.

In a possible implementation, the processing module 211 is configured to:

determine sidelink broadcast information; determine the quantity of uplink slots or the sidelink slots within the frame period according to the sidelink broadcast information, where the quantity of uplink slots or sidelink slots within the frame period is the total quantity of slots available for the resource pool within the frame period.

In a possible implementation, the period of the CG transmission resources is represented based on the quantity of physical slots.

In a possible implementation, the receiving module 210 is specifically configured to:

receive second configuration information, where the second configuration information includes the parameter.

In a possible implementation, the second configuration information is a radio resource control RRC signaling or a downlink control information DCI signaling.

In a possible implementation, the frame period is a system frame number SFN period or a direct frame number DFN period.

In a possible implementation, the parameter further includes a slot offset, where for any one of the frame periods, the slot offset is used to determine the time domain position of the first CG transmission resource belonging to the first resource pool in the frame period.

In a possible implementation, the parameter further includes a slot offset, where for any one of the frame periods, the slot offset is used to determine the time domain position of the first CG transmission resource in the frame period.

In a possible implementation, the time domain positions of the CG transmission resources in the frame period are determined according to the following parameters:

the period of the CG transmission resources;

the total quantity of slots belonging to the first resource pool within the frame period;

a slot index of a sidelink configured grant transmission resource determined according to the second configuration information.

In a possible implementation, the time domain positions of the CG transmission resources in the frame period are further determined according to the slot offset.

In a possible implementation, the slot index of the sidelink configured grant transmission resource is a slot index within one period of the sidelink configured grant transmission resources; or, the slot index of the sidelink configured grant transmission resource is a slot index within the frame period.

The terminal device provided by any of the above implementations is used to execute the technical solution on the terminal device side in any of the above method embodiments, and the implementation principles and technical effects thereof are similar, which will be not repeated here.

Figure 8:
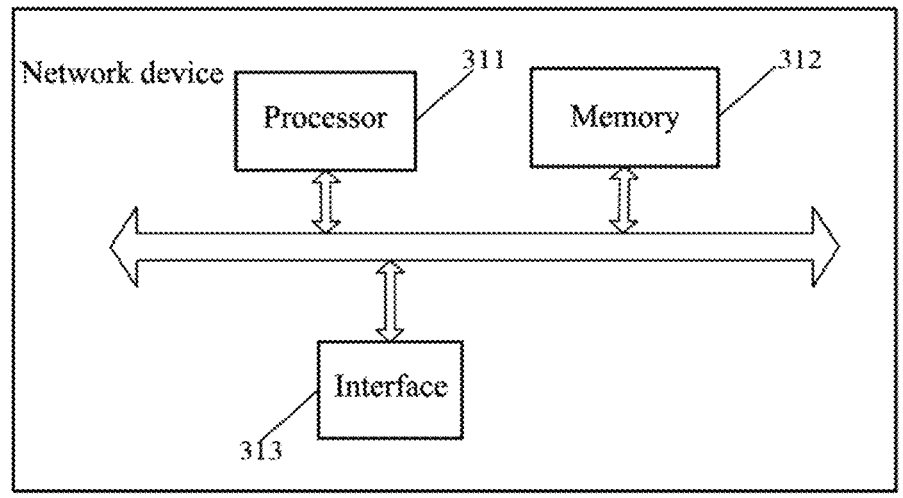
FIG. 8 is a schematic structural diagram of Embodiment 2 of a network device provided by the present application.

FIG. 8 is a schematic structural diagram of Embodiment 2 of a network device provided by the present application. As shown in FIG. 8, the network device includes:

a processor 311, a memory 312, an interface 313 for communicating with a terminal device;

the memory 312 stores computer execution instructions;

the processor 311 executes the computer execution instructions stored in the memory 312, so that the processor 311 executes the technical solution on the network device side in any of the above method embodiments.

FIG. 8 is a simple design of a network device. The embodiments of the present application do not limit the quantity of processors and memories in the network device. FIG. 8 only uses the quantity of 1 as an example for description.

Figure 9:
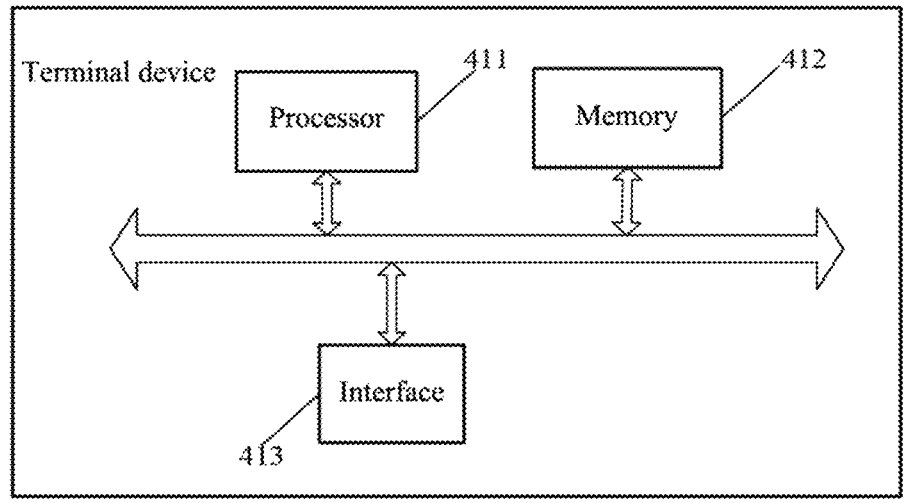
FIG. 9 is a schematic structural diagram of Embodiment 2 of a terminal device provided by the present application.

FIG. 9 is a schematic structural diagram of Embodiment 2 of a terminal device provided by the present application. As shown in FIG. 9, the terminal device includes:

a processor 411, a memory 412, an interface 413 for communicating with a network device;

the memory 412 stores computer execution instructions;

the processor 411 executes the computer execution instructions stored in the memory, so that the processor 411 executes the technical solution on the terminal device side in any of the above method embodiments.

FIG. 9 is a simple design of a terminal device. The embodiments of the present application do not limit the quantity of processors and memories in the terminal device. FIG. 9 only uses the quantity of 1 as an example for description.

In a specific implementation of the network device shown in FIG. 8 and the terminal device shown in FIG. 9, the memory, the processor and the interface may be connected through a bus, and optionally, the memory may be integrated inside the processor.

The embodiments of the present application further provide a computer-readable storage medium, where computer execution instructions are stored in the computer-readable storage medium. When the computer execution instructions are executed by a processor, the computer execution instructions are used to implement the technical solution of the terminal device in any of the above method embodiments.

The embodiments of the present application further provide a computer-readable storage medium, where computer execution instructions are stored in the computer-readable storage medium. When the computer execution instructions are executed by a processor, the computer execution instructions are used to implement the technical solution of the network device in any of the above method embodiments.

The embodiments of the present application further provide a program which, when executed by a processor, is used to execute the technical solution of the terminal device in any of the above method embodiments.

The embodiments of the present application further provide a program which, when executed by a processor, is used to execute the technical solution of the network device in any of the above method embodiments.

In an implementation, the above processor may be a chip.

The embodiments of the present application further provide a computer program product, including program instructions, where the program instructions are used to implement the technical solution of the terminal device in any of the above method embodiments.

The embodiments of the present application further provide a computer program product, including program instructions, where the program instructions are used to implement the technical solution of the network device in any of the above method embodiments.

The embodiments of the present application further provide a chip, including: a processing module and a communication interface, where the processing module is capable of executing the technical solution on the terminal device side in any of the above method embodiments.

Further, the chip also includes a storage module (e.g., a memory), where the storage module is used for storing instructions, and the processing module is used for executing the instructions stored in the storage module. The execution of the instructions stored in the storage module causes the processing module to execute the technical solution on the terminal device side in any of the above method embodiments.

The embodiments of the present application further provide a chip, including: a processing module and a communication interface, where the processing module is capable of executing the technical solution on the network device side in any of the above method embodiments.

Further, the chip also includes a storage module (e.g., a memory), where the storage module is used for storing instructions, and the processing module is used for executing the instructions stored in the storage module. The execution of the instructions stored in the storage module causes the processing module to execute the technical solution on the network device side in any of the above method embodiments.

In the several embodiments provided in the present application, it should be understood that the disclosed devices and methods may be implemented in other manners. For example, the device embodiments described above are only illustrative. For example, the division of the modules is only a logical functional division. In an actual implementation, there may be other division methods. For example, multiple modules may be combined or integrated into another system, or some features may be ignored or not implemented. On the other hand, the mutual coupling or direct coupling or communication connection shown or discussed may be indirect coupling or communication connection through some interfaces or modules, whether in electrical, mechanical or other forms.

In the above specific implementations of the terminal device and network device, it should be understood that the processor may be a central processing unit (CPU for short), or other general-purpose processor, digital signal processor (DSP for short), application specific integrated circuit (ASIC for short), etc. A general-purpose processor may be a microprocessor, or the processor may be any conventional processor, etc. The method steps disclosed in combination with the present application may be directly embodied as being completed by execution by a hardware processor, or by execution by a combination of hardware and software modules in the processor.

All or part of the steps for implementing the above method embodiments may be completed by hardware related to program instructions. The above program may be stored in a readable memory. When the program is executed, the steps including the above method embodiments are executed. The above memory (storage medium) includes: a read-only memory (ROM for short), a RAM, a flash memory, a hard disk, a solid-state drive, a magnetic tape, a floppy disk, an optical disc and any combination thereof.

What is claimed is:

1. A configuration method for a sidelink configured grant, comprising:

receiving, by a terminal device, a parameter for determining sidelink configured grant (CG) transmission resources;

determining, by the terminal device, the CG transmission resources according to the parameter; wherein the parameter for determining the sidelink CG transmission resources is determined based on a logical slot in a first resource pool, and the logical slot is a slot position determined based on resources in the first resource pool;

wherein receiving, by the terminal device, the parameter for determining the sidelink CG transmission resources comprises:

receiving, by the terminal device, second configuration information, wherein the second configuration information comprises the parameter;

wherein time domain positions of the CG transmission resources in frame periods are determined according to a period of the CG transmission resources, a total quantity of slots belonging to the first resource pool within a frame period and a slot of a sidelink CG transmission resource determined according to the second configuration information.

2. The method according to claim 1, wherein the second configuration information is a radio resource control (RRC) signaling or downlink control information (DCI) signaling.

3. The method according to claim 1, wherein the parameter further comprises a slot offset, wherein for any frame period of the frame periods, the slot offset is used to determine a time domain position of a first CG transmission resource belonging to the first resource pool in the frame period, wherein the frame periods are system frame number (SFN) periods or direct frame number (DFN) periods.

4. The method according to claim 1, wherein the time domain positions of the CG transmission resources in the frame period are further determined according to a slot offset.

5. The method according to claim 1, wherein slots of the CG transmission resources meet following formula:

$$\text{Current\_slot} = (S + N*P) \, \text{modulo} \, (NRP,\text{slot});$$

wherein P represents a period parameter of the sidelink CG transmission resources; NRP,slot represents a total quantity of slots of a first resource pool within one frame period; S represents a slot of a sidelink CG transmission resource or logical slot indexes of multiple sidelink transmission resources; Current_slot represents a slot index corresponding to one slot belonging to the first resource pool within one frame period, Current_slot is represented by a logical slot index, and its value range is [0, NRP,slot-1]; and N represents an integer.

6. A terminal device, comprising:
a processor, a memory, an interface for communication with a network device;
the memory stores computer execution instructions;
the processor executes the computer execution instructions stored in the memory, so that the processor is configured to:
control the interface to receive a parameter for determining sidelink configured grant (CG) transmission resources;
determine the CG transmission resources according to the parameter; wherein the parameter for determining the sidelink CG transmission resources is determined based on a logical slot in a first resource pool, and the logical slot is a slot position determined based on resources in the first resource pool;
wherein the processor is specifically configured to:
receive second configuration information, wherein the second configuration information comprises the parameter;
wherein time domain positions of the CG transmission resources in frame periods are determined according to a period of the CG transmission resources, a total quantity of slots belonging to the first resource pool within a frame period and a slot of a sidelink CG transmission resource determined according to the second configuration information.

7. The terminal device according to claim 6, wherein the second configuration information is a radio resource control (RRC) signaling or downlink control information (DCI) signaling.

8. The terminal device according to claim 6, wherein the parameter further comprises a slot offset, wherein for any frame period of the frame periods, the slot offset is used to determine a time domain position of a first CG transmission resource belonging to the first resource pool in the frame period, wherein the frame periods are system frame number (SFN) periods or direct frame number (DFN) periods.

9. The terminal device according to claim 6, wherein the time domain positions of the CG transmission resources in the frame period are further determined according to a slot offset.

10. The terminal device according to claim 6, wherein slots of the CG transmission resources meet following formula:

$$\text{Current\_slot} = (S + N*P) \, \text{modulo} \, (NRP,\text{slot});$$

wherein P represents a period parameter of the sidelink CG transmission resources; NRP,slot represents a total quantity of slots of a first resource pool within one frame period; S represents a slot of a sidelink CG transmission resource or logical slot indexes of multiple sidelink transmission resources; Current_slot represents a slot index corresponding to one slot belonging to the first resource pool within one frame period, Current_slot is represented by a logical slot index, and its value range is [0, NRP,slot-1]; and N represents an integer.

11. A network device, comprising:
a processor, a memory, an interface for communication with a terminal device;
the memory stores computer execution instructions;
the processor executes the computer execution instructions stored in the memory, so that the processor is configured to:
control the interface to send a parameter for determining sidelink configured grant (CG) transmission resources;
wherein the parameter for determining the sidelink CG transmission resources is determined based on a logical slot in a first resource pool, and the logical slot is a slot position determined based on resources in the first resource pool;
wherein the processor is specifically configured to:
send second configuration information, wherein the second configuration information comprises the parameter;
wherein time domain positions of the CG transmission resources in frame periods are determined according to a period of the CG transmission resources, a total quantity of slots belonging to the first resource pool within a frame period and a slot of a sidelink CG transmission resource determined according to the second configuration information.

12. The network device according to claim 11, wherein the second configuration information is a radio resource control (RRC) signaling or downlink control information (DCI) signaling.

13. The network device according to claim 11, wherein the parameter further comprises a slot offset, wherein for any frame period of the frame periods, the slot offset is used to determine a time domain position of a first CG transmission resource belonging to the first resource pool in the frame period, wherein the frame periods are system frame number (SFN) periods or direct frame number (DFN) periods.

* * * * *